United States Patent [19]

Locascio et al.

[11] Patent Number: 5,402,491
[45] Date of Patent: Mar. 28, 1995

[54] METHOD FOR PROVIDING LIMITED SECURE SERVICES IN SECURE TRUNKING COMMUNICATION SYSTEMS

[75] Inventors: Robert J. Locascio, Crystal Lake; Charles C. Kim, Mount Prospect, both of Ill.

[73] Assignee: Donald B. Southard

[21] Appl. No.: 109,563

[22] Filed: Aug. 20, 1993

[51] Int. Cl.⁶ .............................................. H04L 9/08
[52] U.S. Cl. ...................................... 380/21; 380/44; 380/47
[58] Field of Search ............................. 380/21, 44, 47; 455/33.1, 8, 9, 133; 370/95, 2

[56] References Cited

U.S. PATENT DOCUMENTS

| | | | |
|---|---|---|---|
| 4,903,262 | 2/1990 | Dissosway et al. | 370/95.2 |
| 5,020,132 | 3/1991 | Nazarenk et al. | 455/33.1 |
| 5,113,413 | 5/1992 | Brown et al. | 455/133 |
| 5,131,007 | 7/1992 | Brown et al. | 455/133 |
| 5,131,010 | 7/1992 | Derrenge et al. | 455/133 |
| 5,146,498 | 9/1992 | Smith | 380/21 |
| 5,175,866 | 12/1992 | Childress et al. | 455/8 |
| 5,274,838 | 12/1993 | Clildress et al. | 455/9 |

Primary Examiner—Salvatore Cangialosi
Attorney, Agent, or Firm—Timothy W. Markinson; Christopher P. Moreno

[57] ABSTRACT

In a secure trunking communication system, limited secure service is provided during periods of limited service or failsoft operations using the following method. When the limited service or failsoft condition is detected, a limited secure service message or a failsoft service message, respectively, is transmitted to those system components utilizing encryption keys, including console interface units (CIU) (106–107) and communication units (111–113). Upon reception of the limited secure service message, the communication units load at least one limited service key. Simultaneously, the console interface units also load the at least one limited service key. Upon reception of the failsoft service message, the console interface units load at least one failsoft key. Simultaneously, the communication units also load the at least one failsoft key. The communication units and the CIUs use the limited service keys or the failsoft keys until normal operation is restored.

16 Claims, 2 Drawing Sheets

METHOD FOR PROVIDING LIMITED SECURE SERVICES IN SECURE TRUNKING COMMUNICATION SYSTEMS

FIELD OF THE INVENTION

The present invention relates generally to secure trunking communication systems and, in particular, to a method for providing limited secure services therein.

BACKGROUND OF THE INVENTION

Secure trunking communication systems are known to comprise a central controller, a plurality of communication units, broadcast units that transceive a limited number communication resources, a console, and a console interface unit(s). Furthermore, a single, system-wide encryption key is often used to provide secure communications within such systems. As the needs of users of secure trunking communication systems have expanded, the availability of multiple encryption keys for use in communications has become a desirable system feature. The provision of multiple encryption keys within secure trunking systems, however, presents problems that have been heretofore unseen.

In particular, the system-wide use of multiple keys can cause key incompatibilities in the event of partial system failures. For example, if there is a loss of communications between the central controller and the console interface unit(s), often referred to as limited service mode, the console can be isolated from communications because the console interface unit(s) have no way of determining which keys are currently being used by various communication units. As another example, if a communication unit powers-up during a period of time in which the central controller is inoperable, often referred to as failsoft mode, the communication unit has no knowledge of which key to utilize in order to communicate with other communication units. Limited service mode and failsoft mode do not present similar problems in single-key systems since the ambiguities regarding key usage are nonexistent.

A possible solution to these problems is to scan all available keys in the system and determine those keys currently in use. In both examples presented above, this would require the console interface unit(s) to attempt communications with each available key. In a system with even a modest number of keys, this method is difficult and inefficient. Therefore a need exists for a method that provides at least limited secure communication services in multiple key systems during periods of limited service or failsoft operation, without requiring the use of key scanning.

DESCRIPTION OF A PREFERRED EMBODIMENT

Generally, the present invention provides a method for limited secure services within a secure trunking communication system during periods of limited service mode or failsoft mode operations. In the case of limited service operation, this is accomplished by a central controller and/or a limited number of console interface units detecting that the central controller is not operably coupled to the console interface unit(s). This causes the central controller to transmit a limited secure service message to a plurality of communication units. Upon reception of the limited secure service message, each communication unit loads at least one limited service key in to their respective communication unit encryption/decryption devices. The console interface unit(s) also loads the at least one limited service key in to its respective console interface unit encryption/decryption device(s), thus allowing the communication units and the console interface unit(s) to communicate until the central controller is once again able to communicate with the console interface unit(s).

In the case of failsoft operation, limited secure communications is accomplished by a broadcast unit(s) and/or the communication units detecting that the central controller is not operable. This causes each broadcast unit(s) to transmit a failsoft service message to its respective console interface unit. Upon reception of the failsoft service message, the console interface unit(s) load at least one failsoft key in to their respective console interface unit encryption/decryption device(s). The communication units also load the at least one failsoft key in to their respective communication unit encryption/decryption devices, thus allowing the communication units and the console interface unit(s) to communicate until the central controller is once again operable. Thus, in limited service or failsoft mode, secure encryption keys can be used without having to scan an entire list of keys.

Figure 1:
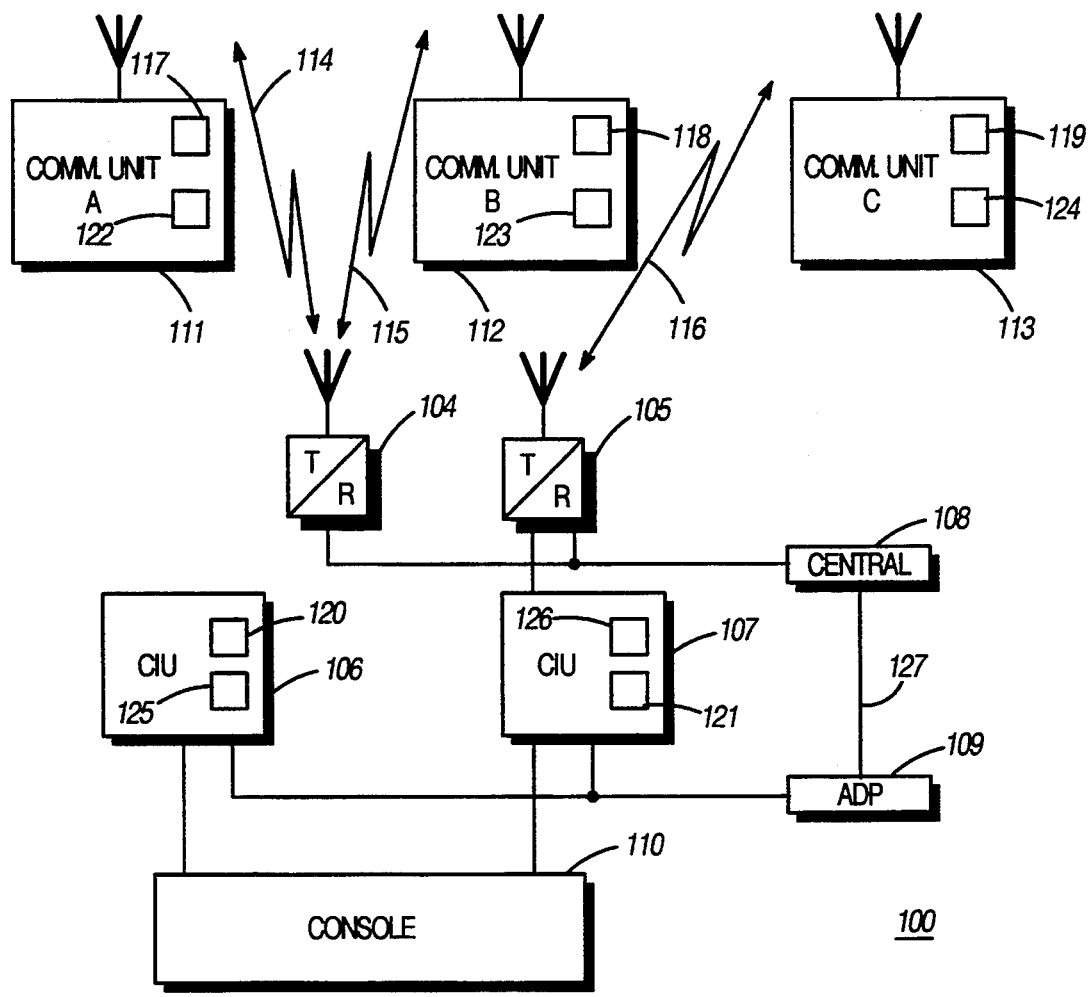
FIG. 1 illustrates a secure trunking communication system in accordance with the present invention.

The present invention can be more fully described with reference to FIG.'s 1 and 2. FIG. 1 illustrates a secure trunking communication system (100) that includes broadcast units (104–105), console interface units (CIU's) (106–107), a central controller (108), an advanced distribution panel (ADP) (109), a console (110), communication units (111–113), communication resources (114–116), encryption/decryption devices (117–121), memory devices (122–126), and a controller-to-ADP link (127). The broadcast units (104–105) may comprise a base station or repeater such as an MSF 5000 as manufactured by Motorola Inc. The console interface units (106–107), which provide an interface between the console (110) and the broadcast units (104–105) and also perform secure encoding and decoding functions, may be Series II Console Interface Units as manufactured by Motorola Inc. The advanced distribution panel (109) is a software driven device that connects the CIU's (106–107) and the central controller (108) and converts the various protocols and routes required messages to the appropriate components. The console (110) consists of one or more dispatcher positions and an audio router such as a CENTRACOM Series II ™ as manufactured by Motorola Inc. The dispatcher position(s) includes controls for each communication resource (114–116). The controller-to-ADP link (127) may be a land line or microwave link used to carry secure trunking control information between the central controller (108) and the CIU's (106–107).

The communication units (111–113) may be portable and/or mobile radios that include encryption/decryption devices (117–119) and memory devices (122–124). The memory devices (122–126), which may be RAM, ROM, EEPROM, or any other means for storing digital information, store encryption key variables, including at least one limited service key and at least one failsoft key. The communication resources (114–116) may be analog or digital messages between the broadcast units (104–105) and the communication units (111–113) over RF radio frequency channel(s).

During normal operation, an operator of the communication unit (111–113) can set the talk mode to secure and select a talk group, causing the communication unit (111–113) to load a prearranged encryption key for the selected talk group in to its communication unit encryption/decryption device (117–119). Once the operator depresses the PTT (push to talk) button, a channel request message is transmitted to the central controller (108). Upon receiving the channel request message, the central controller (108) assigns a communication resource (114–116) and sends a key assignment message for the selected talk group to the ADP (109) via the controller-to-ADP link (127). The ADP (109) forwards the key assignment message to the CIU's (106–107). The CIU (106–107) having a matching target address decodes the key assignment message and loads the prearranged encryption key in to its console interface unit encryption/decryption device (120–121), thus allowing the console (110) to communicate with the communication unit (111–113). By design, normal operation is possible only when the central controller (108) and the controller-to-ADP link (127) are operable.

A limited service mode is entered if the controller-to-ADP link (127) is down due to a land line break or microwave dish problem, for example, or if the ADP (109) is inoperable. This results in the CIU's (106–107) not receiving the key assignment messages from the central controller (108) and consequently not loading the appropriate encryption keys. Without the proper encryption keys, the CIU's (106–107) are unable to encode/decode audio for the console (110) and the console operator is unable to participate in any secure communications.

Similarly, a failsoft mode is entered if the central controller (108) is inoperable, typically caused by a power failure. In this case, the communication units (111–113) and the broadcast units (104–105) revert to a predetermined communication resource (114–116) to communicate. Without the central controller (108) to coordinate operations within the system (100), neither the communication units (111–113) or the CIU's (106–107) know which key variables to use. Again, without the proper encryption keys, the CIU's (106–107) prevent the console operator from participating in any secure communications. These difficulties are overcome through the use of the methods described by the present invention.

Figure 2:
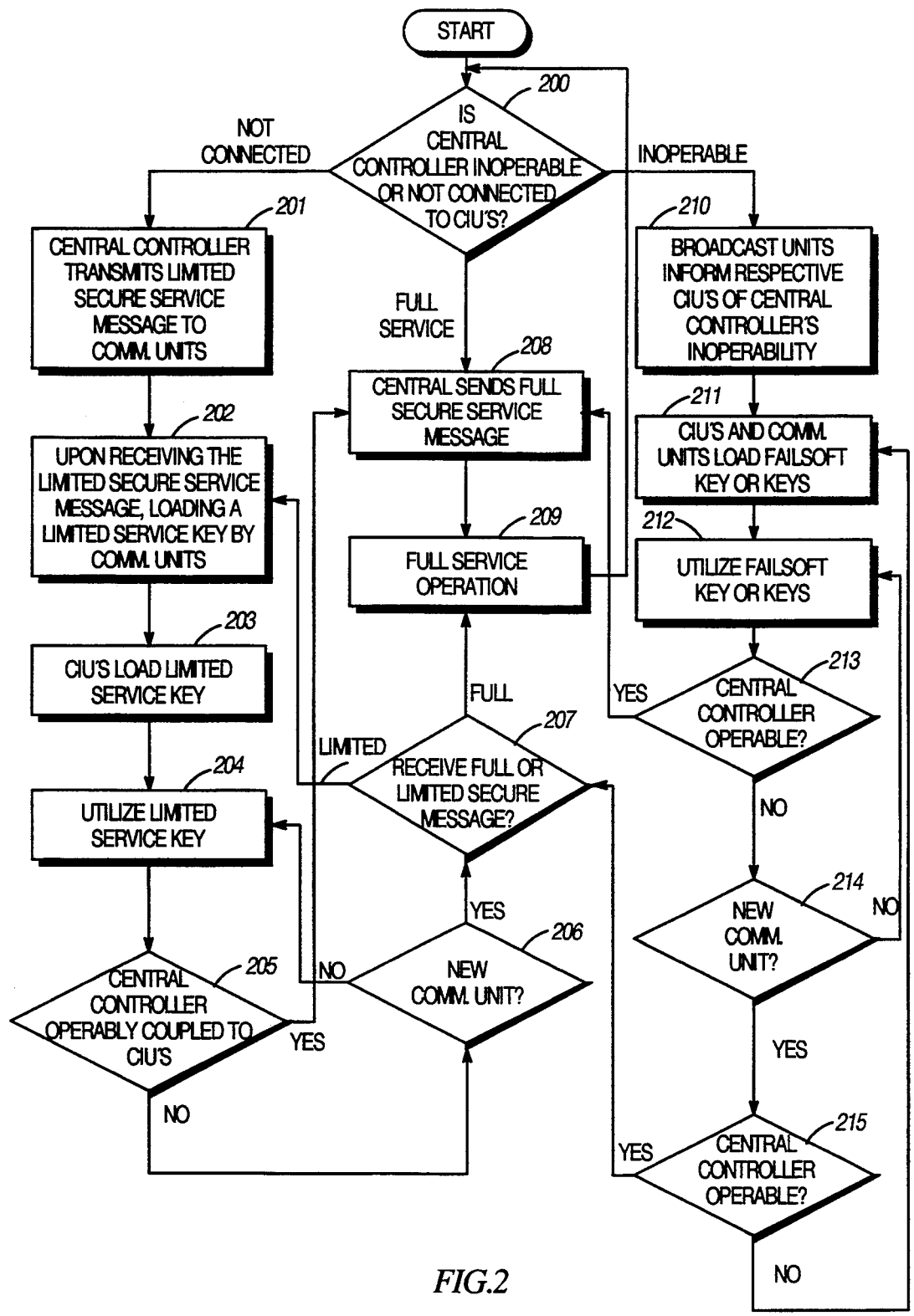
FIG. 2 illustrates a logic diagram which may be incorporated by a secure trunking communication system to implement the present invention.

FIG. 2 illustrates a logic diagram which may be incorporated within a secure trunking communication system to implement the present invention. Using the elements of FIG. 1 to illustrate, the process begins at step 200 where it is determined if the central controller (108) is operable, inoperable, or unable to communicate with the CIU's (106–107). Assuming for the moment that the central controller (108) is operable, the central controller (108) tests the controller-to-ADP link (127) by periodically sending a message (often referred to as a sanity check) to the ADP (109) and receiving an acknowledgment from the ADP (109). The ADP (109) determines the controller-to-ADP link (127) status with the central controller (108) in a similar manner. Furthermore, the CIU's (106–107) determine if they can communicate with the central controller (108) in a similar manner. When the central controller (108) does not receive an acknowledgment from the ADP (109), it enters the limited service mode. Typically, the controller-to-ADP link (127) is the cause of the central controller (108) not being linked with the CIU's (106–107).

Alternatively, if the central controller (108) is inoperable, this condition is detected by the broadcast units (104–105) and the communication units (111–113). When the broadcasting units (104–105) do not receive the sanity check from the central controller (108), each broadcast unit (104–105) transmits a failsoft service message, in the form of a set of previously defined failsoft tones, to their respective CIU's (106–107). The console interface units (106–107) receive the failsoft service message by decoding the failsoft tones and enter a failsoft mode. Similarly, when the communication units (111–113) cannot detect a dedicated control channel, as transmitted by the central controller (108), the central controller (108) is assumed to be inoperable, and each communication unit (111–113) enters a failsoft mode.

If it is determined (200) that the central controller (108) is fully operational and connected to the console interface units (106–107), a full secure service message, as a part of a larger secure trunking system status message, is generated by the central controller (108) and transmitted (208) to the communication units (111–113) and the CIU's (106–107). The full secure service message indicates that the system (100) is operational and that the communication units (111–113) and the CIU's (106–107) should load regular talk group encryption keys. At this point, full secure service continues (209) and the process restarts at step 200.

If it is determined (200) that the central controller (108) is operable, but not connected to the console interface units (106–107), the process continues with step 201. At step 201, the central controller (108) transmits a limited secure service message to the communication units (111–113) to indicate that the system has entered a limited service mode. Upon receiving the limited secure service message, each communication unit (111–113) loads at least one limited service key (202) into a communication unit encryption/decryption device (117–119). It is understood that each communication unit (111–113) can have more than one communication unit encryption/decryption device (117–119) and thus may load more than one limited service key. The limited service key is a system-wide key. That is, it is an identical encryption key used by all devices within the system (100). The manner in which encryption key variables are loaded and utilized for secure communications is well known in the art, thus no further discussion will be presented except to facilitate understanding of the present invention.

In conjunction with the loading of the limited service key in step 202, the at least one limited service key is also loaded (203) in to a console interface unit encryption/decryption device (120–121) for each CIU (106–107). This action is taken once the CIU's (106–107) detect that they are no longer able to communicate with the central controller (108), as described above. Those skilled in the art will recognize that each CIU could load a unique limited service key such that each CIU is then capable of communicating with only a certain subset of the plurality of communication units having the identical limited service key.

Having loaded the at least one limited service key in to both the communication units (111–113) and the CIU's (106–107), secure communications can then take place utilizing the limited service key (204). If it is subsequently determined (205) that the central controller (108) has resumed communications with the CIU's (106-107), the process proceeds to step 208. If the CIU's (106-107) are still unable to communicate with the central controller (108) and no communication units (111-113) have entered (powered-up) the system (206), the process continues at step 204.

It is possible that communication units (111-113) inoperative during the initial transmission of the limited secure service message may power-up (206) while the central controller (108) remains operably disconnected (205) from the CIU's (106-107). Whenever a communication unit (111-113) powers-up, it must first receive either a full secure service message or a limited secure service message (207) before operation, i.e., transmitting a secure message, is allowed. In this manner, communication units (111-113) entering the system can determine which encryption keys are required. If a limited secure service message is received, the process proceeds to step 202. If a full secure service message is received, the process continues at step 209.

If it is determined (200) that the central controller (108) is not operable, the process continues at step 210 where each broadcast unit (104-105) transmits the failsoft service message to their respective CIU's (106-107). Upon receiving the failsoft service message, the CIU's (106-107) load at least one failsoft key (211) into their respective console interface unit encryption/decryption devices (120-121). In a preferred embodiment, each respective console interface unit (106-107) loads a unique failsoft key. Also, at step 211, the communication units (111-113), having already detected that the central controller (108) is inoperable, load the at least one failsoft key in to their respective communication unit encryption/decryption devices (117-119). In a preferred embodiment, each communication unit (111-113) determines a default broadcast unit based on predetermined information, such as a default broadcast unit identification code stored in memory (122-124). As each broadcast unit (104-105) has a respective CIU (106-107) associated with it, the identification of a default broadcast unit (104-105) necessarily identifies the unique failsoft key loaded in the respective CIU's (106-107). The unique failsoft key associated with each communication unit's (111-113) default broadcast unit is thus selected from memory (122-124) and loaded by each communication unit (111-113). In this manner, the at least one failsoft key ensures that each communication unit (111-113) is able to communicate (212) in a secure fashion with the console (110) via at least one CIU (106-107).

Once use of the at least one failsoft key has been established, the broadcast units (104-105) continually monitor the central controller (108) for the full secure service message to determine if the central controller (108) has become operable (213). If the central controller (108) has once again become operable, the process continues at step 208, as described above.

If, however, the central controller (108) is determined to be inoperable, it must be determined if any new communication units (111-113) have entered the system (214). If no new communication units (111-113) have been powered-up, the process continues at step 212. If new communication units (111-113) have entered the system, they must first determine if the central controller (108) is operable (215), as described above. If the central controller (108) is not operable, the process continues at step 211. If the central controller (108) is operable, the process continues at step 207.

The present invention provides a method for limited secure communications within a secure trunking communication system. With such a method, a console in a multiple encryption key system can continue to securely communicate with communication units during periods of limited service operation or failsoft operation. This is accomplished by ensuring that identical limited service or failsoft encryption keys are used by the CIU's and the communication units when needed. In this manner, the need for CIU's and communication units to scan all available encryption keys for usage prior to transmitting and receiving secure messages is substantially eliminated.

We claim:

1. In a secure trunking communication system that includes a central controller, a plurality of communication units, a limited number of broadcast units that transceive a limited number of communication resources, at least one console, and a limited number of console interface units that are operably coupled to the limited number of broadcast units, the at least one console, and the central controller, a method for providing limited secure services when the central controller is not operably coupled to the limited number of console interface units, the method comprises the steps of:
   a) determining, by the central controller and the limited number of console interface units, that the central controller is not operably coupled to the limited number of console interface units;
   b) transmitting, by the central controller, a limited secure service message to the plurality of communication units;
   c) upon receiving the limited secure service message, loading, by each of the plurality of communication units, at least one limited service key into a communication unit encryption/decryption device;
   d) loading, within each of the limited number of console interface units, the at least one limited service key into a console interface unit encryption/decryption device;
   e) utilizing the at least one limited service key by the plurality of communication units and the limited number of console interface units until the central controller is operably coupled to the limited number of console interface units.

2. In the method of claim 1, step (b) further comprises periodically transmitting, by the central controller, the limited secure service message to the plurality of communication units.

3. In the method of claim 2, step (e) comprises:
   1) determining, by the central controller and the limited number of console interface units, that the central controller is operably coupled to the limited number of console interface units; and
   2) transmitting, by the central controller, a full secure service message to the plurality of communication units.

4. The method of claim 3 further comprises the step of:
   f) upon power up of a communication unit of the plurality of communication units, inhibiting, by the communication unit, transmission of a secure communication until the limited secure service message or the full secure service message is received.

5. In a secure trunking communication system that includes a central controller, a plurality of communication units, a limited number of broadcast units that transceive a limited number of communication resources, at least one console, and a limited number of console interface units that are operably coupled to the limited number of broadcast units, the at least one console, and the central controller, a method for the central controller to provide limited secure services when the central controller is not operably coupled to the limited number of console interface units, the method comprises the steps of:

a) determining, by the central controller, that the central controller is not operably coupled to the limited number of console interface units;

b) transmitting, by the central controller, a limited secure service message to the plurality of communication units;

c) determining, by the central controller, that the central controller is once again operably coupled to the limited number of console interface units; and d) when the central controller is once again operably coupled to the limited number of console interface units, transmitting, by the central controller, a full secure service message to the plurality of communication units.

6. In a secure trunking communication system that includes a central controller, a plurality of communication units, a limited number of broadcast units that transceive a limited number of communication resources, at least one console, and a limited number of console interface units that are operably coupled to the limited number of broadcast units, the at least one console, and the central controller, a method for the limited number of console interface units to provide limited secure services when the central controller is not operably coupled to the limited number of console interface units, the method comprises the steps of:

a) determining, by the limited number of console interface units, that the central controller is not operably coupled to the limited number of console interface units;

b) loading, within each of the limited number of console interface units, at least one limited service key into a console interface unit encryption/decryption device; and c) utilizing the at least one limited service key by the limited number of console interface units until the central controller is operably coupled to the limited number of console interface units.

7. In a secure trunking communication system that includes a central controller, a plurality of communication units, a limited number of broadcast units that transceive a limited number of communication resources, at least one console, and a limited number of console interface units that are operably coupled to the limited number of broadcast units, the at least one console, and the central controller, a method for a communication unit of the plurality of communication units to provide limited secure services when the central controller is not operably coupled to the limited number of console interface units, the method comprises the steps of:

a) receiving, by the communication unit, a limited secure service message;

b) loading, by the communication unit, at least one limited service key into a communication unit encryption/decryption device; and c) utilizing, by the communication unit, the at least one limited service key until a full secure service message is received.

8. The method of claim 7 further comprises the steps of:

d) upon power up of the communication unit, inhibiting, by the communication unit, transmission of a secure communication until the limited secure service message or the full secure service message is received.

9. In a secure trunking communication system that includes a central controller, a plurality of communication units, a limited number of broadcast units that transceive a limited number of communication resources, at least one console, and a limited number of console interface units that are operably coupled to the limited number of broadcast units, the central controller, and the at least one console, a method for providing failsoft services when the central controller is inoperable, the method comprises the steps of:

a) determining, by the limited number of broadcast units and the plurality of communication units, that the central controller is not operable;

b) transmitting, by each of the limited number of broadcast units to a respective console interface unit of the limited number of console interface units, a failsoft service message;

c) upon receiving the failsoft service message, loading, within each of the respective console interface units, at least one failsoft key into a console interface unit encryption/decryption device;

d) loading, by each of the plurality of communication units, the at least one failsoft key into a communication unit encryption/decryption device; and e) utilizing the at least one failsoft key by the plurality of communication units and the limited number of console interface units until the central controller is operable.

10. The method of claim 9 further comprises the steps of:

f) when the central controller is once again operable, transmitting, by the central controller, a full secure service message to the plurality of communication units.

11. In the method of claim 9, step (c) further comprises loading a unique failsoft key of the at least one failsoft key into the console interface unit encryption/decryption device of the each of the respective console interface units.

12. The method of claim 11 further comprises the steps of:

f) determining, by each of the plurality of communication units, a default broadcast unit of the limited number of broadcast units, wherein the determination of the default broadcast unit for each of the plurality of communication units is based on predetermined information; and g) loading, by each of the plurality of communication units, the unique failsoft key of the respective console interface units into the communication unit encryption/decryption device.

13. In a secure trunking communication system that includes a central controller, a plurality of communication units, a limited number of broadcast units that transceive a limited number of communication resources, at least one console, and a limited number of console interface units that are operably coupled to the limited number of broadcast units, the central controller, and the at least one console, a method for the limited number of console interface units to provide failsoft services when the central controller is inoperable, the method comprises the steps of:

a) receiving, by each of the limited number of console interface units, a failsoft service message;

b) loading, within each of the limited number of console interface units, at least one failsoft key into a console interface unit encryption/decryption device; and c) utilizing the at least one failsoft key by the limited number of console interface units until the central controller is operable.

14. In the method of claim 13, step (b) further comprises loading a unique failsoft key of the at least one failsoft key into the console interface unit encryption/decryption device of the each of the respective console interface units.

15. In a secure trunking communication system that includes a central controller, a plurality of communication units, a limited number of broadcast units that transceive a limited number of communication resources, at least one console, and a limited number of console interface units that are operably coupled to the limited number of broadcast units, the central controller, and the at least one console, a method for a communication unit of the plurality of communication units to provide failsoft services when the central controller is inoperable, the method comprises the steps of:

a) determining, by the communication unit, that the central controller is not operable;

b) loading, by the communication unit, at least one failsoft key into a communication unit encryption/decryption device; and c) utilizing the at least one failsoft key by the communication unit until the central controller is operable.

16. The method of claim 15 further comprises the steps of:

d) determining, by the communication unit, a default broadcast unit of the limited number of broadcast units, wherein the determination of the default broadcast unit for the communication unit is based on predetermined information; and e) loading, by the communication unit, a unique failsoft key of the at least one failsoft key into the communication unit encryption/decryption device that corresponds to the default broadcast unit.

* * * * *